United States Patent [19]

Barr

[11] 4,004,574
[45] Jan. 25, 1977

[54] SOLAR ENERGY CONCENTRATING AND COLLECTING ARRANGEMENT WITH SUN-FOLLOWER AND SOLAR ENERGY SENSING POWER CONTROL AND METHOD

[75] Inventor: Irwin R. Barr, Baltimore County, Md.

[73] Assignee: AAI Corporation, Cockeysville, Md.

[22] Filed: Nov. 20, 1974

[21] Appl. No.: 525,545

[52] U.S. Cl. .............................. 126/271; 237/1 A; 60/641
[51] Int. Cl.² ......................................... F24J 3/02
[58] Field of Search .......... 126/270, 271; 237/1 A; 60/641

[56] References Cited

UNITED STATES PATENTS

| | | | |
|---|---|---|---|
| 1,814,897 | 7/1931 | Coxe | 126/270 |
| 2,712,772 | 7/1955 | Trombe | 126/270 |
| 2,976,533 | 3/1961 | Salisbury | 126/270 |
| 3,868,823 | 3/1975 | Russell, Jr. et al. | 126/270 |

FOREIGN PATENTS OR APPLICATIONS 635,283  12/1927  France ............................ 126/271

Primary Examiner—Kenneth W. Sprague
Assistant Examiner—James C. Yeung
Attorney, Agent, or Firm—Reginald F. Pippin, Jr.

[57] ABSTRACT

A solar energy concentrating and collecting arrangement and method in which a semi-cylindrical oblong concave reflector/concentrator forms the roof of a house, school or other building, particularly a heat utilization building. A collector is movably supported in spaced relation above and along the length of the oblong roof/reflector concentrator, for pivotal movement, by a solar reflection energy sensing and seeking drive control arrangement, to a zone of maximum confluence of solar energy rays reflected from the roof/reflector concentrator as a result of variations of sun path during the various parts of the year and also to further accommodate each day's movement of the sun. Movement of the collector is by pivotal movement about an axis parallel with the center of curvature or curvatures of the roof/reflector concentrator and disposed adjacent the roof/reflector concentrator. The roof/reflector has a plurality of radii, for enabling accommodation of wide variations of the sun angles during the various seasons of the year and during each day of a given season, while still affording a desired concentration of solar energy on the collector. The concentrated solar energy collected by the collector is transferred to a fluid, such as water, passed along the length of collector, by a pump forming a part of a heat utilization system, which may include heating and/or cooling of the building and/or additional buildings or other structures. The roof/reflector concentrator is oriented with its center of curvature axes running East-West and with its surface tilted toward the Equator, the degree of tilt being dependent upon the latitude of the reflector.

13 Claims, 9 Drawing Figures

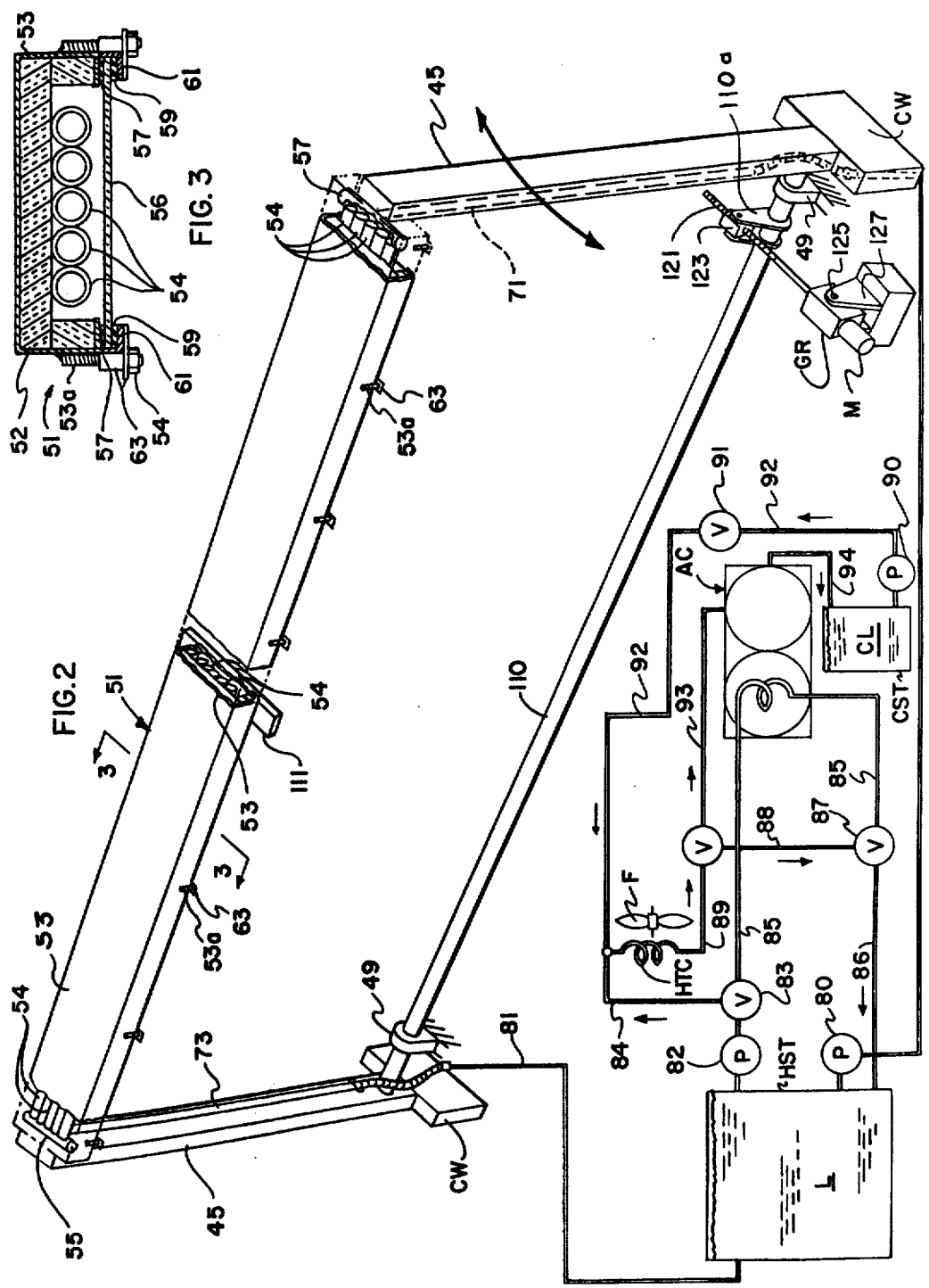

SOLAR ENERGY CONCENTRATING AND COLLECTING ARRANGEMENT WITH SUN-FOLLOWER AND SOLAR ENERGY SENSING POWER CONTROL AND METHOD

This invention relates to a solar energy concentrating and collecting arrangement and method, and more particularly to such an arrangement as applied in conjunction with a building in which the roof forms a solar energy year-round reflector-concentrator for a movable collector which seeks the various positions required for maximizing of the collected solar energy as a function of the solar angle throughout the year and during each day.

Various solar energy collection arrangements are known. Many utilize a parabolic mirror or mirrors with a collector located at the focus. These mirrors and collectors conventionally move as a unit for pointing at the sun.

Several other prior arrangements employ a stationary mirror or mirrors with a movable collector or collectors. Among these are a spherical mirror construction with a movable centrally spaced collector arranged to angularly move about a fulcrum according to the position of the sun and the season of the year. The spherical mirror employs a complex curvature which is difficult, expensive, and impractical for large manufacture. A second prior art arrangement, as shown in German Pat. No. 517,417, issued Feb. 4, 1931, uses an oblong laterally symmetrical parabolic mirror with its horizontal focus line directly vertically above the center of and symmetrical with the oblong parabolic reflector. To accommodate small variations in sun angle away from the vertical, the collector is moved both laterally and vertically through a pivoted telescoping arm and cam guideway arrangement. The compass orientation of this system is not clear in view of various inconsistencies in the description. However, in any event it appears that as a practical matter very little angular movement of the sun away from the vertical (as viewed from the end of the reflector and collector) can be accommodated with this system, and certainly not the extent of annual change of sun angle relative to the horizontal. In addition, the system is relatively complex and to a considerable extent unwieldy on a large scale in view of the guide cam and telescoping arm requirements. It appears that to utilize this arrangement over any extended period of days or seasons, and even during large changes of sun angle during some days of the year, the reflector would also require some form of rocking or pivoted reorientation to vary the angular position of the focal line of the mirror, in addition to utilizing the cam and telescoping collector/support arm arrangement.

It is an object and feature of the present invention to provide a relatively simple solar energy concentrating and maximum energy-seeking collection arrangement which enables the employment of a fixed reflector and simply movable collector while providing for practical year-round utilization during the major insolation periods in each day of the year.

It is a further object and feature of a further aspect to provide a building with a fixed roof which serves as a year-round effective reflector concentrator for a movable maximum energy-seeking collector which may be moved to optimize the collection of solar energy from the roof reflections.

Still a further object and feature of another aspect of my invention is to provide an apparatus for solar energy concentration and utilization, with a maximum energy-seeking solar energy collector, and which may be utilized on a year-round practically effective basis at various latitudes, while enabling the use of a reflector which may be fixed for a given latitude position.

Another object and feature is to enable the year-round practical concentration and sun-reflection following collection of solar energy striking a roof without requiring passage of heat transfer fluid along and within the roof surface, as in flat plate-type solar collector arrangements.

Still other objects, features and attendant advantages will become apparent to those skilled in the art from a reading of the following detailed description of a physical embodiment and mode of practice of the invention, taken in conjunction with the accompanying drawings, wherein:

FIG. 2 is a schematic view of the pivoted collector and the over-all heat exchange system of the embodiment of FIG. 1, showing the collector in more detail and clarity.

FIG. 3 is a section view taken on line 3—3 of FIG. 2.

Figure 1:
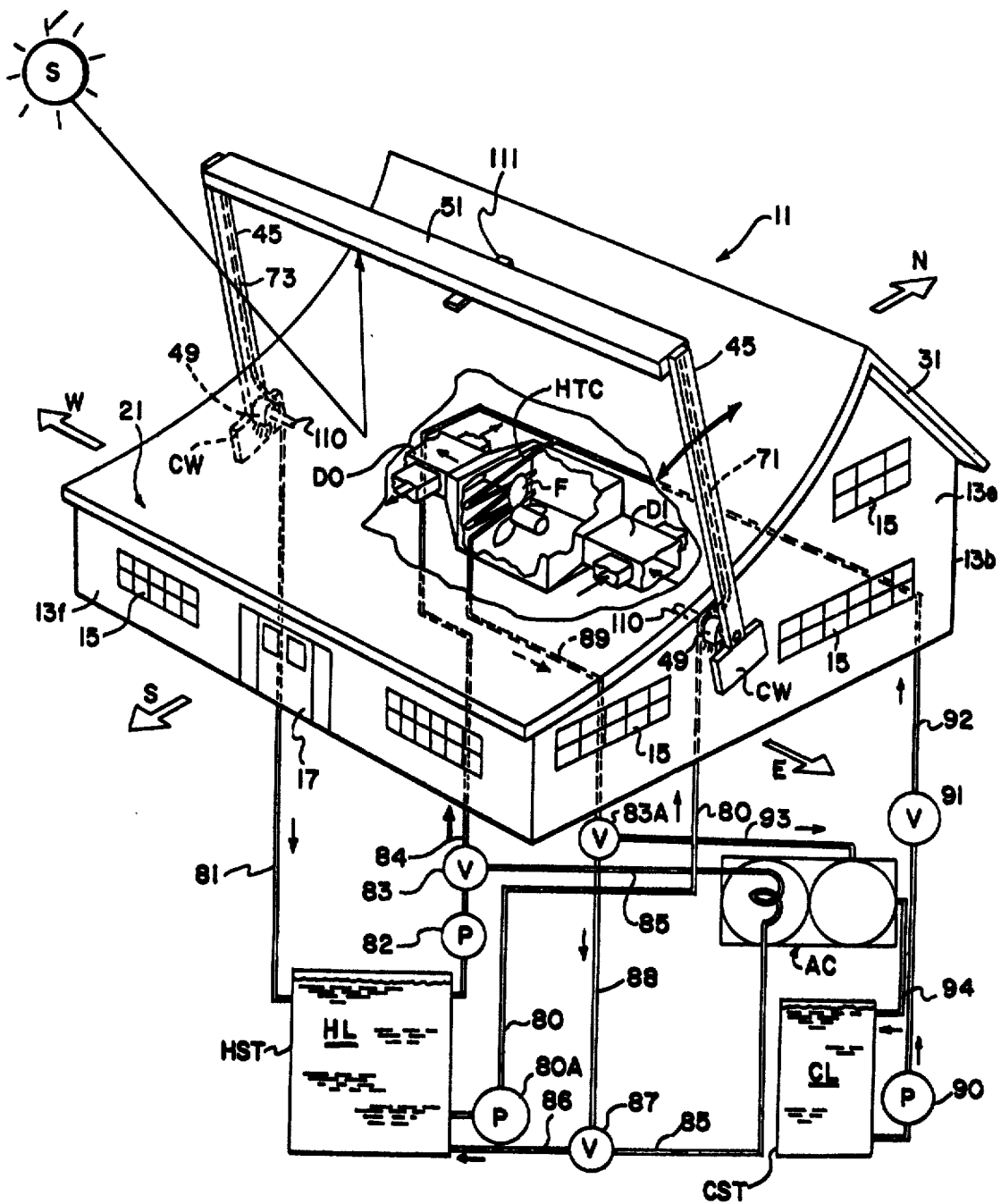
FIG. 1 is a schematic view of a building, such as a house, factory, school, etc., embodying my invention.

Referring now in detail to the Figures of the drawings, a heat utilization building structure, such as a house, school, factory, etc., generally indicated at 11, has a curved roof/reflector-concentrator surface 21, and may also have a further roof surface or surfaces of any desired configuration as indicated at 31. The extent of reflector-concentrator surface 21 is generally dependent upon the amount of solar energy needed for a given desired use. For maximum energy collection from a given roof size, the entire roof may be formed as a reflector-concentrator 21. Windows 15 may be provided in walls 13f, 13e, 13b, as desired.

Roof/reflector-concentrator 21 may be formed of any suitable solar reflective material, such as metal, glass, plastic, and such materials may be of load-bearing type and provide some, a major portion, or all of the roof surface construction strength or may be of non-load-bearing type as, for instance, a thin reflective coating on a load-bearing substrate. The desired curvature of roof/reflector-concentrator 21 may be formed as a smooth curve or as straight or curved line segments. For instance, a curved metal roof surface may be formed in one continuous sweep, or in several panels, or various normally straight panels of metal, glass, plastic, etc. may be utilized in suitably joined relation to form the desired over-all curved shaped roof/reflector-concentrator surface 21. The roof 21 may also be only partially reflective in parts thereof or in whole, if so desired, in order to provide for natural lighting of the interior of the building by light passage through the roof/reflector-concentrator 21. Similarly, the section 31 of the roof may also transmit light to the building interior if so desired.

Figure 5:
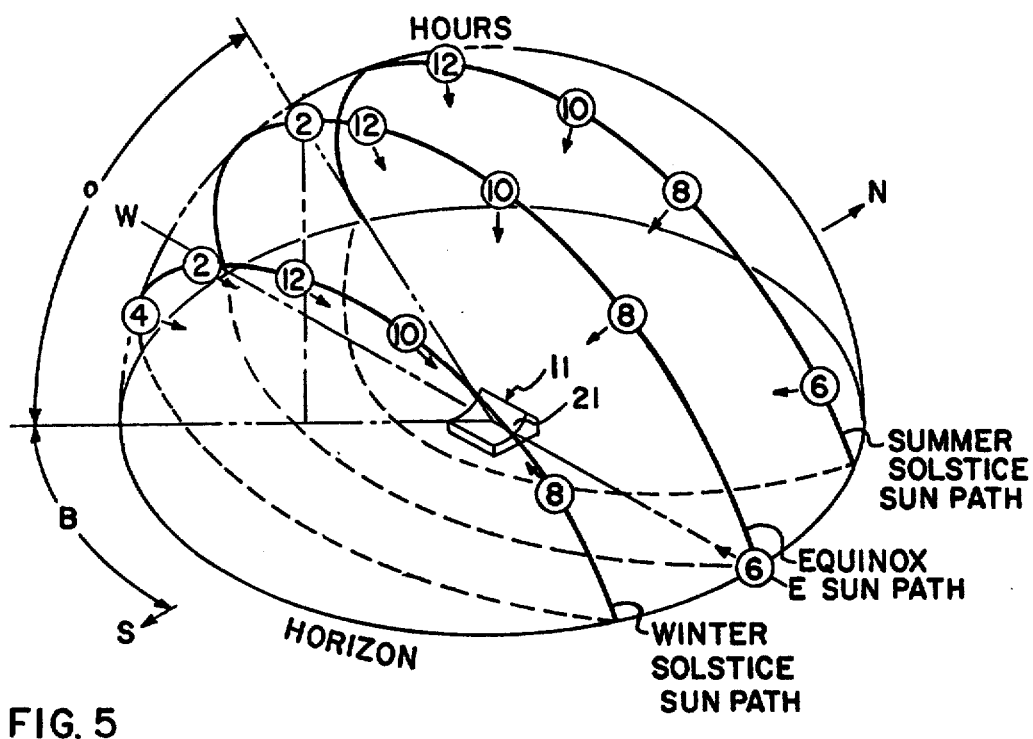
FIG. 5 is a conventional sun path diagram in perspective, showing the relative passages of the sun in the sky vault with respect to the embodiment of FIG. 1, and its horizon, for a location of approximately 40° N latitude.
Figure 6:
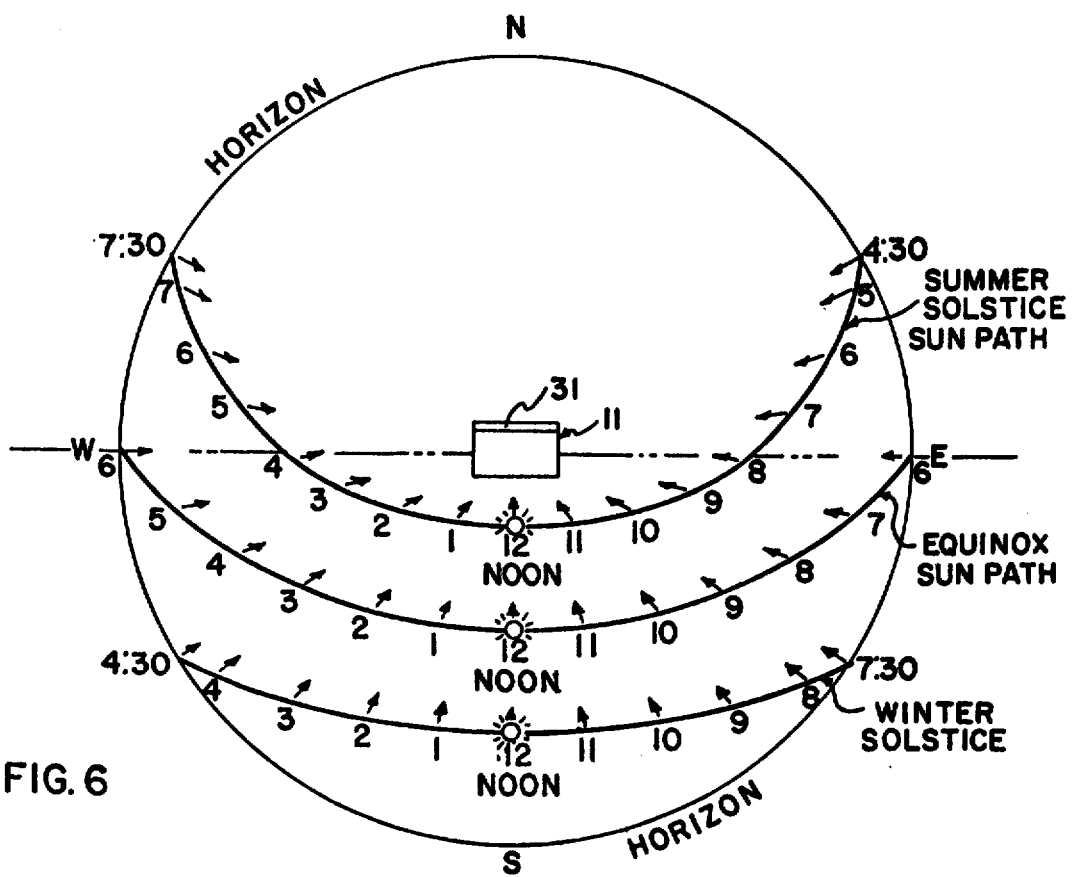
FIG. 6 is a conventional sun path diagram, depicting the path of the sun within the sky vault of FIG. 4 as projected onto a horizontal plane, with the horizon represented by a circle with the building solar collector arrangement of FIG. 1 at the center.
Figure 7:
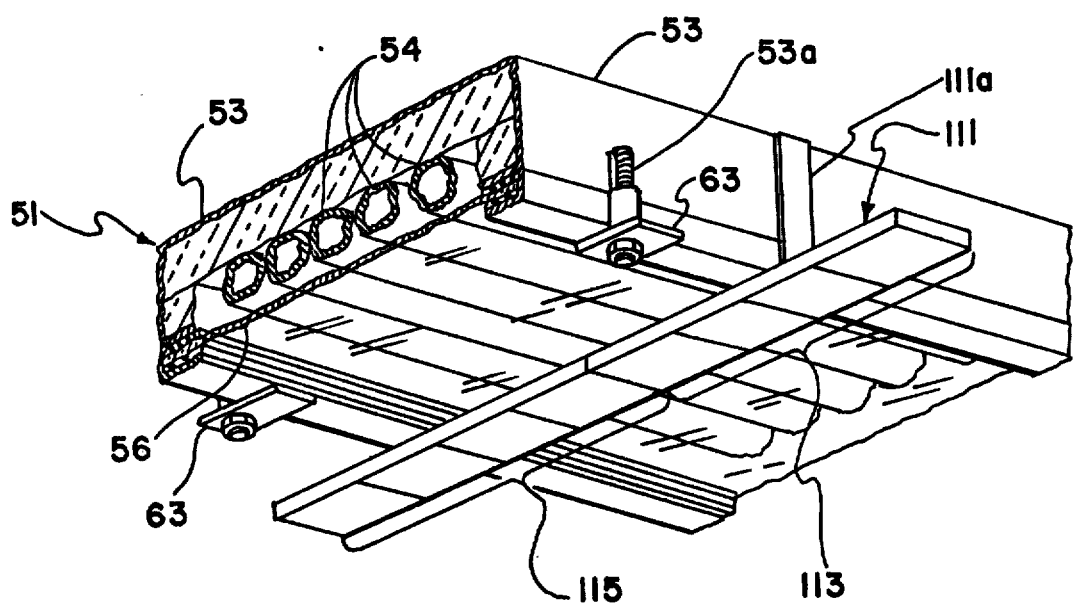
FIG. 7 is a fragmentary view of the collector showing the differential energy-sensing photo-cell arrangement mounted thereon.

The roof/reflector-concentrator 21 faces and is inclined toward the South, with its opposite ends oriented directly East-West, as shown in FIGS. 1, 5 and 6.

The stationary reflector-concentrator 21 reflects and concentrates solar energy into a zone of maximum confluence which varies as a function of the angle of the sun with respect to the horizontal, as measured in a North-South vertical plane passing through the reflector-concentrator 21. A solar energy collector 51 is movably mounted, as by pivot arms 45, for back-and-forth movement in a North-South direction above the reflector-concentrator 21, as shown generally in FIGS. 4 and 4A.

The collector pivot support arms 45 are pivoted along a horizontal East-West line which may extend beneath, above or at the surface of reflector-concentrator 21, with generally only small differences in effectiveness of the reflector-concentrator 21/collector 51 assembly. In the illustrative embodiment the arms 45 are mounted on pivot support 49 which lie beneath the surface of the reflector-concentrator 21, and on a line TR (see FIG. 4A) forming a tangency line between the arc segments SR1 and SR2 formed by the two radii R1 and R2. In an illustrative embodiment, as generally shown, the ratio of the reflector-concentrator chord-/length subtended area versus the effective collection area of the collector is approximately 9 to 1, thereby providing a maximum feasible concentration or amplification factor of no more than 9. However, other factors, such as angle of inclination, and interference of the collector 51 in passage of the sun's rays to the reflector-concentrator 21 (as at summer periods), reduce the maximum possible value to a lesser possible value for various solar angles. This factor further depends upon the extent of interception of the zone of solar reflection confluence by the collector 51, as will be subsequently discussed in more detail.

Arm and collector assembly 45, 51 may be desirably suitably counterweighted, as by counterweights CW, and are desirably interconnected at the pivot zone by a torque tube or shaft 110 for desired added rigidity.

Collector 51 may be suitably formed with a plurality of laterally side-by-side fluid flow heat transfer tubes 54, through which a suitable fluid, such as water, gas, etc. may be flowed for collection of the reflected solar energy from reflector-concentrator 21. Headers or manifolds 55, 57 may be employed at either end for interconnecting the parallel flow tubes 54 with common feed and return conduits 71, 73 mounted on the two end support arms 45.

As shown in FIG. 3, the collector 51 is formed with its black body energy absorption tubes 54 facing toward the pivot axis of the arm and collector assembly 45, 51, and thereby facing the solar reflection thereto from reflector-concentrator 21 at a given proper angle of this assembly with respect to a given sun elevation angle. Collector 51 preferably is insulated at its outer surface facing away from reflector-concentrator 21 and the pivot axis of the collector 51, as by insulation 52, with a rigid opaque U-shaped cover plate 53. A solar energy transparent cover glass plate or plates 55 may be secured beneath the energy absorption tubes 54, and the entire assembly may be secured together as by threaded studs secured as by welding to the cover plate 53 at spaced longitudinal intervals along its length, with securing nuts and securing brackets holding the glass plate 56 and headers 55, 57 in place, the glass plate being preferably sandwiched between two layers of elastic shock-resistant material 69, such as soft rubber.

Fluid feed and return lines 71, 73 may be suitably connected to a desired heat utilization system, such as a heat storage and building interior heating arrangement, and/or a cooling system, such as one based on absorption cooling principles. Alternatively, various machinery may be caused to perform work by energy derived from the solar heat transferred to the fluid in collector 51, or other desired and suitable heat-energy-derived work may be performed. With this invention, fluid temperatures, such as for water as the fluid, may be raised to as high as 300° F or more, dependent on fluid flow rate, relative sizes of collector and reflector, etc. Practical heating and absorption cooling may be accomplished well within and below this temperature extent for the fluid L flowed through the collector 51.

As an illustrative example, a liquid fluid such as water may be pumped by a pump 80 through lines 71, 54 and 81 to a hot liquid storage tank HST, in which the hot liquid is stored for subsequent heating or cooling use as desired. For heating of the interior of building 11, or other desired area, a conventional hot water heating system may be employed, as with a pump 82, two- or three-way valve 83, conduit 84, heat transfer coil HTC, fan F, further two- or three-way valve 83A conduit 88, two- or three-way valve 87 and return line 86. The fan F may pump air over the coils HTC, where it is heated and thereupon flows through ducts D0 throughout the building 11, with return in the conventional fashion through ducts DI.

For cooling, an absorption cooler AC may be provided, with hot liquid HL pumped through the unit by pump P, through valve 83, conduit 85, valve 87 and return conduit 86. Cooled water or other cooling fluid CL is pumped through cooler AC by pump 90, through cool storage tank CST, and out through valve 91, conduit 92, thence through coils HTC, and return through conduit 93 to cooler AC, conduit 94 and cool storage tank CST, with the valves set for flow in the cooled liquid conduits and for closure of the conduits 84 and 88.

The pivot arms 45 may be pivoted about their axis by suitable reversible drive means. In the illustrative embodiment a motor M rotates a threaded drive screw shaft 121 through a gear reduction unit GR, the motor M and gear reduction unit GR and shaft 121 being pivotally mounted as a unit as at 125 on a suitable pivot support 127. A nut follower 123 threadedly engages drive screw shaft 121 and is pivotally secured on a torque arm 110a, in turn secured on torque tube 110. The motor M is suitably driven to position the arm and collector assembly 45, 51 during the various days of the year and the various insolation hours of each day as may be desired.

Suitable reflected energy-responsive control means are employed for controlling the drive motor M. To this end, a differential solar energy-sensing means 111 in the form of a pair of sets 113, 115 of photocells or other photo- or heat-responsive elements, all of which may be generally termed as solar energy-sensing elements, is mounted on the collector 51 for movement therewith. For simplicity of description, such sets of solar energy-sensing elements may be generally referred to as simply as photocell sets or photocell set arrays. Photocell sets 113 and 115 are disposed transversely of the length of collector 51 and preferably at right angles thereto, as illustrated, with the effective midpoint or cross-over point therebetween lying on the effective longitudinal center line of the collector 51.

The outputs of photocell sets 113 and 115 are balanced against one another, as by employing a common output junction 114 for the two photocell sets, the outputs of which feed in balanced relation into a differential amplifier 117, having a D.C. output proportional to the difference in input signals from photocells 113 and 115.

The D.C. output from differential amplifier 117 may be suitably amplified, as may be necessary or desired, as by a D.C. amplifier 119, which in turn may control a three-way relay 121, having forward, reverse, and neutral or balanced stop positions for controlling electrical power to a D.C. or other suitable drive motor M.

Drive motor M in turn drives the arm 45/collector 51 assembly forward and rearward about its pivot axis 110, through the medium of a gear reduction unit GR, drive screw 121, and drive nut follower 123 secured or otherwise suitably connected to arm 45.

As shown in FIGS. 1 and 2, motor M may be suitably pivotally mounted, and drive nut follower 123 may be suitably pivotally connected to arm 45, to accommodate angular changes in the linkage connections during movement of arm 45.

Photocell sets 113, 115, formed of photocells or other solar energy-sensing elements, may be of the active or passive type, and in the instance of some relatively large signal output types of solar energy-sensing elements it may be feasible to feed the outputs of the solar energy-sensing elements in balanced relation directly to a three-way relay 120, or other switching arrangement for motor M.

Figure 8:
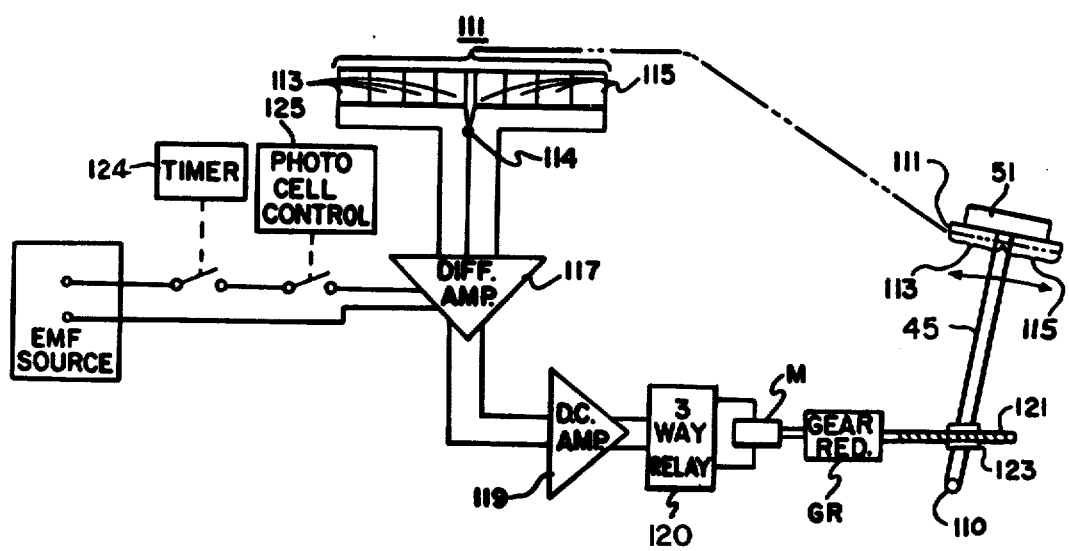
FIG. 8 is a schematic diagram illustration of the maximum energy-seeking null-type drive control arrangement for effecting following motion of the collector to a point of maximum energy pickup.

As previously generally noted, in lieu of photocells 113, 115, other suitable solar energy-sensing means may be employed, if desired. For instance, heat-energy-responsive resistance-changing wires may be employed, again arranged in a balanced output relation, as by employing two sets of one or more such wires on the collector 51 and disposed transversely of the reflector-facing surface of the collector 51 and having their electrical outputs feeding a suitable differential amplifier 117 or other differential output-sensing means, the differential between the outputs of, or resulting signals across, the two sets of heat-energy-responsive resistance-changing wires being employed either directly or in amplified form to control the forward, reverse, or stop condition of a motor M and associated drive train arrangement as in the embodiment of FIG. 8.

Alternative to reversing motor M, a similarly solar-energy-balance/unbalance-controlled reversing gear train and clutch arrangement may be employed, and a neutral gear position may be employed in lieu of stopping the motor M, although the latter condition would normally be undesirable in view of unnecessary energy expenditure in continuously driving motor M.

Photocell set arrays 113, 115 may be made up of any desired number of individual cells per set, with equal set outputs for the balanced position of equal solar energy on each set. The photocell set arrays 113 and 115 are arranged with their effective pick-up or sensing surfaces facing the axis 110 of arm 45, and thus at all times face the reflector 21, thereby picking up and sensing the reflected solar energy from reflector 21 for any given position of the arm 45 and the sun. The photocells are suitably shielded against reverse or ultra-wide-angle-side pickup, and the balanced photocell array 111 and associated control circuitry causes the arm 45/collector 51 assembly to seek the zone of maximum energy pick-up by both of the two photocell sets 113, 115, whereby the arm 45/collector 51 is positioned at maximum reflected solar energy pick-up by collector 51 from reflector 21 for a given angle of the sun above the horizon. To effect such maximizing of the position of the arm 45/collector 51 assembly, the relay 120 is connected to cause motor M to drive the arm 45 in the direction of the greater output one of the photocell sets 113, 115.

In order to minimize unnecessary on-line drive power requirements for the control and drive arrangement 111–123, M, while still affording drive power for positioning the arm 45/collector 51 assembly during desired periods of effective insolation, the power to the control and drive arrangement 111–123, M may be suitably controlled as by a power on-off timer 124 and an auxiliary solar energy-sensing power on-off control 125. Timer 124 and auxiliary photocell control 125 are arranged with their respective power control switches in series-controlling relation with the EMF source power line to the differential amplifier 117, and likewise similarly control the power to the remaining elements (eg, D.C. amplifier 119, relay 120, motor M, etc.) of the system, and only when both switches are closed will the control and drive arrangement 111–123, M for arm 45 be operative to move arm 45 in the manner as noted above. Timer 124 may be set to be in a closed-switch condition for a specific portion of the daylight hours or for all daylight hours, and in an open-switch condition for other times, and photocell control 125 may in turn be set to switch to a closed-switch condition only in the presence of a solar energy level at the system site sufficient in quantity to effectively operate the over-all system or to economically justify operation of the system. Of course, one or both of timer 124 and photocell control 125 may be omitted, if desired, for a given installation, with resultant omission of the corresponding function.

It will be appreciated that while photocell array 113, 115 faces the reflector-concentrator 21, the photocell or other solar energy-sensing element of control 125 may be either directly exposed to sunlight as by mounting face upon the roof 21 or other suitable portion of the building, or near the building, and may employ one or several photocells or other solar energy-sensing elements, which may be close together or spaced apart to obtain an average or weighted measurement and resultant switch control. Alternatively, the one or several solar energy-sensing elements of the photocell control 125 may be mounted on the underside of the collector 51, thus providing a total measurement corresponding to the reflected energy received at the collector 51, in which case the solar energy-sensing elements of control 125 may desirably be several in number and disposed at spaced positions along the length of collector 51 to afford an average, or if desired a weighted, measurement of the reflected solar energy being received by the collector 51.

Figure 4:
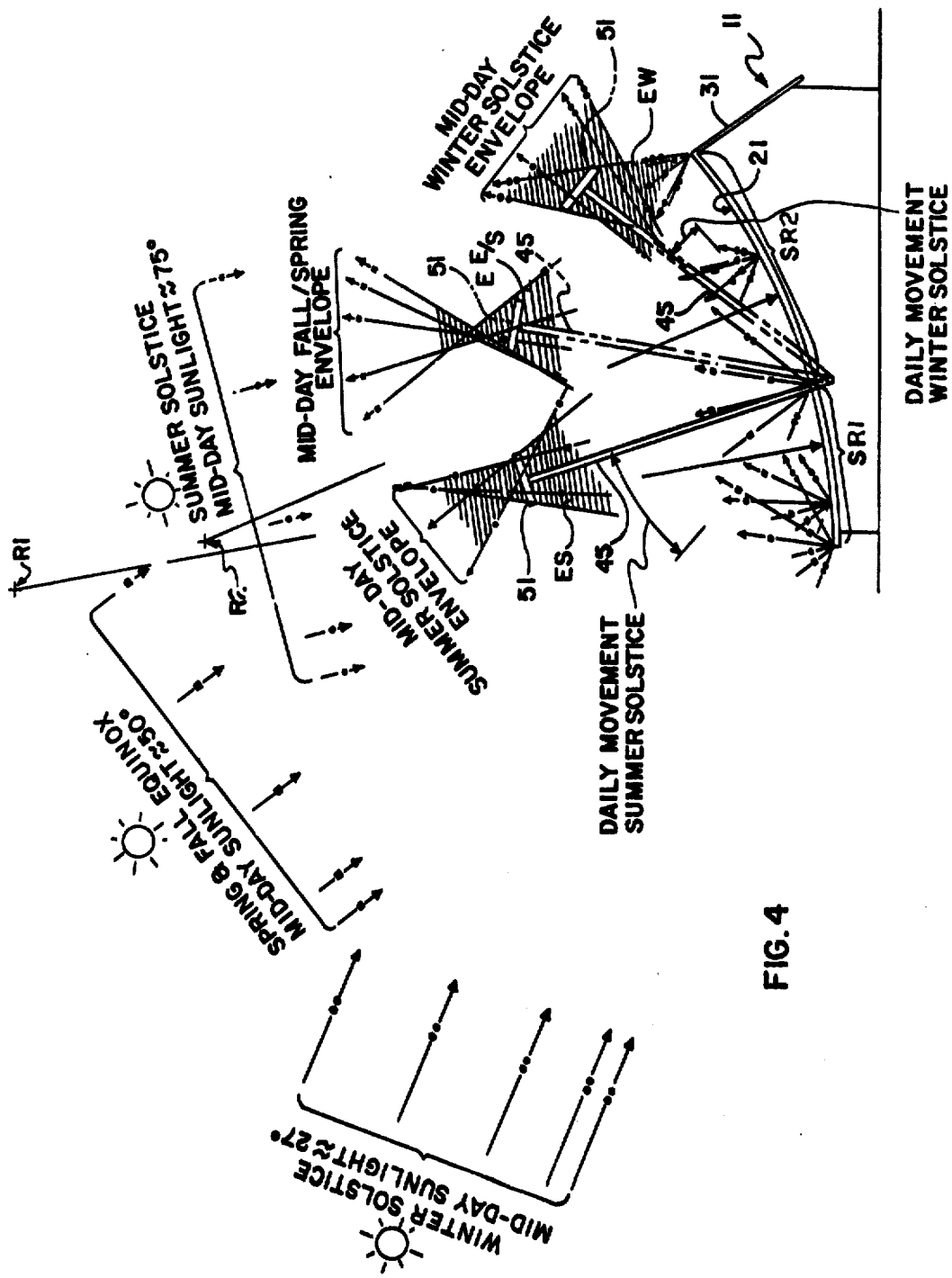
FIGS. 4 and 4A are diagrammatic illustrations of the mode of operation of the arrangement of FIG. 1 at various times during the year, FIG. 4A also showing various angle and dimensional relationships for a given preferred embodiment.
Figure 4A:
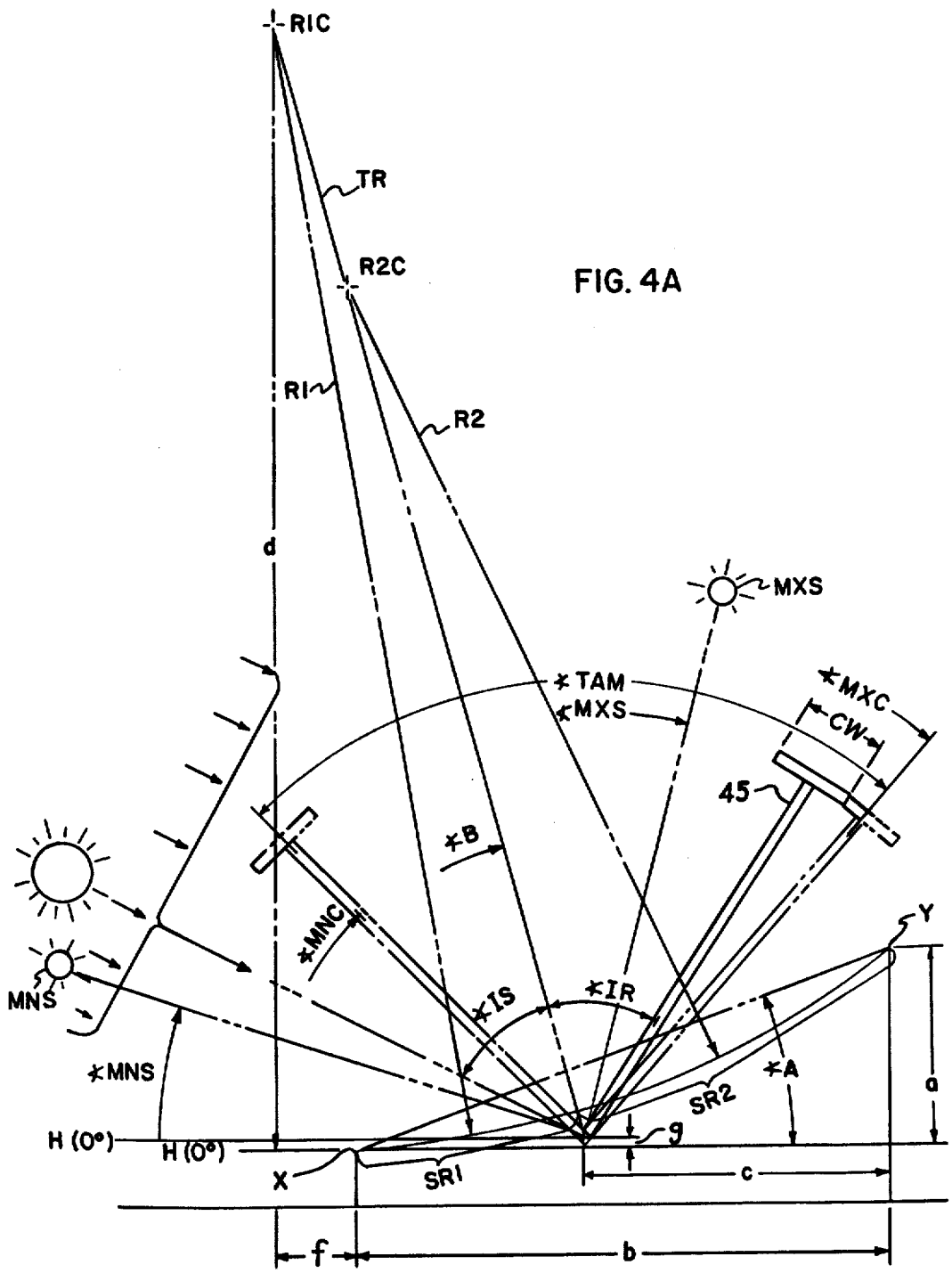

A particular illustrative embodiment for latitudes of approximately 30°–40°, such as generally illustrated, may suitably employ the following relationships, referring to FIG. 4A for reference characters and elements:

| | |
|---|---|
| Radius R1 of front arc segment SR1 | = 19.8 units |
| Radius R2 of rear arc segment SR2 | = 15.0 units |
| Angle B formed by tangency radius line TR common to radii R1 and R2 | = 75 degrees |
| Effective width CW of collector 51 | = 1.22 units |
| Length of pivot arm 45 | = 7.2 units |
| Angle A formed by the chord line extending between front and rear horizontal lines X and Y | = 20 degrees |
| Length a | = 3.4 units |
| Length b | = 9.4 units |
| Length c | = 6 units |
| Length f | = 1.35 units |
| Length g | = 0.45 units |
| Arc segment SR1 | ≈ 4 units |
| Arc segment SR2 | ≈ 6.8 units |
| Minimum sun angle MNS desired to be accommodated by collector 51 | ≈ 18 degrees |
| Maximum sun angle MXS desired to be accommodated by collector 51 | ≈ 104 degrees |
| Minimum required angle MNC for collector/arm assembly 51, 45 to accommodate maximum desired sun angle (of approximately 104 degrees) | ≈ 46 degrees |
| Maximum required angle MXC for collector/arm assembly 51, 45 to accommodate minimum desired sun angle (of approximately 18 degrees) | ≈ 132 degrees |

For normal practical purposes the general approximate desired angular position for the collector 51/arm 45 assembly may be determined for a given sun angle by forming the angle IR between the arm 45 and the tangency line TR approximately equal to the angle IS formed between the incoming sun rays and the tangency line TR. However, if desired, a more precise determination of arm 45 for each solar angle may be more precisely determined for a given reflector-concentrator 21, either by empirical plotting, or computer or other mathematical analysis of the confluence lines along the front-to-back extent of the reflector with the collector positioned for the particular desired maximizing of reflected solar energy interception at the various sun angles, with such compromises between maximums at various angles as may be desired for a given location, combustion, and utilization. Such calculation is not necessary, however, with the present invention, as the collector 51/arm 45 assembly will be driven to the optimum energy collection position for each instantaneous angular position of the sun above the horizontal (within the practical limits of effective solar energy utilization) by the reflectance energy-sensing and following arrangement 111-121, with its overriding controls 124, 125.

Referring again to FIGS. 4 and 4A, desirably, arc segments SR1 and SR2 are smoothly joined at a common point of tangency, a common tangency radius line TR extending through the centers of radius R1C and R2C for the two radii R1 and R2. As noted above, in an illustrative embodiment suitable for latitudes 30°–40°, this line TR suitably forms an angle of 75° with the horizontal H, and such angle approximates the summer solstice midday angle of the sun at 40° latitude. This tends to maximize the solar energy concentration or amplification factors during the summer period at some degree of minimizing of the winter solar energy concentration or amplification factors by the reflector/collector assembly 21, 51. Other angles of line TR may be suitably employed with different weighting of these factors.

Various zones of reflected solar energy confluence for the illustrative embodiment are schematically shown in FIG. 4, the zones being only approximately shown and representing the midday times at approximately 40° N latitude for the sun's position at noon on each of the winter solstice, summer solstice and spring and fall equinoxes. I have found that a good ratio of energy concentration and collection can be obtained over the major insolation periods of each day of the year by employing a pivotally mounted collector, with the pivot line parallel to the centers of radius of the roof reflector-concentrator 21 and by utilization of two or more radii for respectively two or more of the sections of the reflector-concentrator 21. In the illustrative example, two radii are satisfactorily employed, the smaller radius R2 defining the rear reflector surface arc segment SR2 and the larger radius defining the reflector surface arc segment SR1, as shown schematically in FIG. 4A. Referring again to FIG. 4, it will be noted that at no sun angle or reflection zone does the multiple-radii generated reflector-concentrator 21 form a single focus line, but instead forms various zones of confluence, and the size and location of the zones of confluence vary with the sun angle, which in turn varies both over the period of a year and during each day. In this respect, inspection of the sun path illustrations for the illustrative 40° N latitude location readily show the requirements imposed on the system in given days over the period of a year. For instance, at summer solstice, the sun's apparent path causes rising and setting behind the reflector-concentrator 21 and the sun path crosses to the frontal zone of the reflector-concentrator 21 at approximately 8 AM, with a zenith angle of approximately 75° at midday, and again crosses to a zone behind the reflector-concentrator 21 at approximately 4 PM. At the opposite extreme of winter solstice, the sun is at all times of the day in front (i.e. South) of the reflector-concentrator 21, although it rises later (i.e. approximately 7:30 AM) and sets earlier (i.e. approximately 4:30 PM) and has a lower zenith angle (approximately 27°, see FIG. 4). On the other hand, the spring and fall equinoxes find the sun rising at 6 AM on the East-West axis line of the reflector-concentrator, setting at 6 PM on the East-West axis line of the reflector-concentrator, and rising to a zenith angle of approximately 50° at midday. On all days except the fall and spring equinoxes, the center of the zone of reflection maximum confluence from reflector-concentrator 21 varies throughout the day and differs on succeeding days from a low frontal zone at the summer solstice to a low rearward reflection zone at winter solstice. These zones are illustratively indicated in FIG. 4, and designated as daily movement zones for the collector 51 and its supporting pivot arms 45. In the illustrative embodiment and mode of practice of the invention, for approximately 40° N latitude, the required daily movement of the arm and collector assembly 45, 51 at the summer solstice extends from approximately 46° to 77° relative to the zero degree horizontal as measured from the North-South front of the reflector-concentrator, making a total angle of desired pivotal movement of the collector 51 of approximately 31° in order to accommodate the major solar insolation period of from approximately 7:30 AM to 4:30 PM. Less collector movement would be required for a lesser time of effective energy collection, and vice versa. For practical purposes, this is considered to represent a good working period at summer solstice. It will be noted from FIG. 4 that the reflector-concentrator can and does accommodate solar angles to a limited degree behind the 90° vertical as the indicated low zone of daily movement at summer solstice is approximately 46° and results when the sun is at approximately 7:30 AM and 4:30 PM respectively, which, as shown in FIG. 6, is in each instance substantially behind and to one side of the reflector-concentrator 21. Of course, the side or end angle of inclination must also be considered, and in order to maximize solar energy collection at low end angles the same as measured in the East-West vertical plane, the reflector-concentrator 21 and collector 51 should desirably be relatively long along their length, particularly with respect to the distance of the collector 51 from the reflector-concentrator 21.

In the illustrative embodiment, the winter solstice envelope has a center of maximum confluence angle, (and concomitant angle of arm/collector assembly 45, 51), varying from approximately 123°–132°, or over an angle of approximately 9° for a variation of sun angle of approximately 18°–27° over the major useful insolation period of approximately 9 AM–3 PM at this time of year.

As the days approach the spring and fall equinoxes the daily excursions of movement required for the arm/collector assembly 45, 51 decrease, until at the respective two equinoxes the arm/collector assembly 45, 51 requires no angular movement as the sun rises and sets on the East-West orientation line of the reflector-concentrator axes, and forms a constant angle throughout the day as measured in a North-South vertical plane passing through the reflector-concentrator 21.

In the illustrative embodiment, the solar concentration factors, or amplification factors, vary with the solar angle, this concentration or amplification factor having a minimum possible value at winter solstice and a maximum possible value at midday summer solstice, as will be noted from examination of FIG. 4. This maximum possible concentration factor is a function of the angle of inclination of the sun with respect to the chord line extending between the front and rear line zones X and Y (see FIG. 4A), the lower angle of inclination the lesser possible maximum possible concentration or amplification factor. In addition, the concentration or amplification factor is a function of the extent of coverage or interception of the zone of confluence of the reflected solar energy at a given sun angle, and it is therefore desirable to maximize this extent of interception at the various angular positions of the sun and the collector/arm assembly 51, 45, insofar as is practical and economical.

I have found that my mounting the arm 45 on a pivot axis near the surface of reflector-concentrator 21, as at, above or beneath the reflector surface, an adequate extent of interception of the various zones of solar energy confluence may be obtained for the collecter 51. In the illustrative embodiment the horizontal pivot line for pivot support arms 45 is disposed slightly beneath the effective reflective surface of reflector-concentrator 21, and is located approximately on an extension of the tangency radius TR line joining arc segments SR1 and SR2. However, this arm pivot line may if desired be otherwise located for a given embodiment, as for instance above or at the surface of reflector-concentrator 21, and may lie other than on the tangency radius line TR. In the particular illustrative embodiment, with the arm 45 pivot line disposed beneath the roof surface forming reflector-concentrator 21, the pivot supports 49 may if desired be suitably carried by ceiling rafters, beams or trusses, or such may be mounted interiorly or exteriorly of the building on other suitable support means such as posts, pilings, etc.

It will, of course, be appreciated that all of the drawings are only illustrative and are not themselves intended to be illustrated necessarily in true size relationships, although such is to some extent approximately the case, as particularly in FIG. 4A. This observation applies also to the zones of solar reflection confluence and the collector 51 interception zones, although such are shown to give a fairly indicative illustration of the principles and mode of operation and practice involved.

Referring now again to FIG. 4, for the winter solstice midday position of the sun at approximately 27° and with the arm and collector assembly 45, 51 at approximately 132°, for the illustrated embodiment the concentration or amplification factor may approach approximately 6, while having a desired high concentration or amplification factor of approximately 7 at summer solstice midday and approximately 6.2 at midday of spring and fall equinoxes. These concentration factor values are, of course, only illustrative and may vary with other embodiments with their respective dimensional relationships.

The typical specific illustrative example proportions as previously shown and described, particularly with respect to FIG. 4A, are, as previously noted, for an embodiment and practice of the invention primarily within a latitude of approximately 30° to 40°. Also, as noted, the embodiment is arranged such that the concentration factors for summer solar energy collection are maximized, to some expense at the expense of winter concentration factors, in order to maximize available solar-derived heat energy for air conditioning, (although still enabling the satisfaction of minimum requirements for heating during at least the major portion of most winter conditions). For lower latitudes of for instance approximately 20° to 30°, where the angle of the sun is high during winter, and where capture of solar energy in the summer for air conditioning purposes is even more important, the same geometry of collector 51, arms 45, and reflector-concentrator 21 assembly can be employed, insofar as length and arrangement of radii and pivot points are concerned, except that the entire reflector-concentrator, pivot arm, collector assembly can be tilted about line X to a lower more suitable angle of chord line X-Y, determined by the given latitude location. Utilization of the arrangement at higher latitudes of for instance approximately 40° to 50°, with winter heating being more of a requirement than summer cooling, generally the same geometric configuration can be employed at a greater tilt angle for chord line X-Y, to as great an angle as 40°, dependent on the particular latitude location.

While the invention has been illustrated and described with respect to a particular illustrative embodiment and mode of practice, and various possible modifications have been described, it will be appreciated that various further modifications and improvements may be made without departure from the scope and spirit of the invention. For instance, the reflector-concentrator 21 may be formed as a reflector-concentrator only, and not as a roof of a building, although this is normally the most advantageous and preferred embodiment. The reflector-concentrator 21 may be mounted on a building roof, or away from any building requiring energy from the system. Also, the reflector-concentrator 21 may form other parts of a building, such as a side wall. Further, while a pivoted support arm arrangement 45 is illustrated and preferred for supporting and moving the collector 51 through the desired zone of movement, various other collector-supporting and movement arrangements may be employed. Also, while two radii R1 and R2 are employed in the illustrative example, especially for simplicity of design and construction, more than two radii may be suitably employed, graduating from longest at the front (e.g. the portion facing the Equator) to shortest at the rear zone of the roof, and may in fact be constructed with a continuously varying radius from front to back of the reflector-concentrator 21. Such a continuously varying radius reflector-concentrator 21 may, however, be beyond the desired complexity for normal construction and the dual radius construction is considered to be adequate and most easily constructed from a practical standpoint. Accordingly, the invention is not to be limited to the particular illustrative embodiment and mode of operation and practice, but only by the scope of the appended claims.

I claim:

1. A solar energy concentrating and collecting arrangement, comprising
   a generally upwardly facing concave generally semi-cylindrical reflector-concentrator having a longitudinal axis,
   and a movable solar energy collector mounted for movement above said reflector-concentrator, in a direction transverse to said longitudinal axis,
   differential solar energy-sensing means disposed on said movable collector for movement therewith and in effectively transversely centered relation relative to the effective longitudinal center line of said movable collector and having a differential energy-sensing direction oriented transversely of said longitudinal axis of said reflector-concentrator,
   and means for moving said collector transversely of said longitudinal axis extent of said semi-cylindrical reflector-concentrator as a function of solar energy sensed by said differential energy-sensing means.

2. An arrangement according to claim 1,
   said reflector forming a generally effectively overall curved reflecting surface formed by a plurality of radii, the smaller of said radii forming the zone of said surface furthermost from the Equator.

3. An arrangement according to claim 2,
   a chord passing between the front and rear effective longitudinally extending edge zones of the portion of said reflector formed by two adjacent plural radii surface portions being tilted toward the Equator.

4. An arrangement according to claim 1,
   said differential energy-sensing means being disposed on the lower side of said variable collector and facing said reflector for detecting solar energy reflected from said reflector.

5. An arrangement according to claim 1,
   said differential energy-sensing means comprising plural photo-sensory means oriented in a generally North-South plane and extending transversely of the longitudinal axis of said reflector-concentrator and along the direction of movement of said collector.

6. An arrangement according to claim 1,
   said differential energy-sensing means comprising plural heat-sensing means oriented in a generally North-South plane and extending transversely of the longitudinal axis of said reflector-concentrator and along the direction of movement of said collector.

7. An arrangement according to claim 1,
   differential amplifier means in operative connection with said differential solar energy-sensing means,
   and motor means operatively connected through a drive arrangement in movement-imparting relation to said energy collector and responsive to the output of said differential amplifier means to move said collector to a zone of minimum differential energy sensation by said differential solar energy-sensing means,
   said drive arrangement comprising a drive screw selectively drivable by said motor in opposite rotational directions and a drive nut follower in driven engagement therewith, said drive nut being connected in driving relation with said collector.

8. An arrangement according to claim 8,
   and a plural pivoted support arm assembly carrying said collector about a pivot axis, said drive nut being connected in pivoted-movement-effecting relation with said pivoted support arm assembly.

9. An arrangement according to claim 8,
   and a timer power control switch in power cut-off, cut-on controlling relation with said motor means for enabling said motor only during desired daylight hours.

10. An arrangement according to claim 9,
    and solor energy-responsive power control switch means having a solar energy-sensing element and a power control switch responsive to said solar energy-sensing element and in power cut-off, cut-on controlling relation with said motor means and in series relation with said timer power control switch for enabling said motor only during periods when solar energy exceeds a desired threshold value on said solar energy-sensing element.

11. An arrangement according to claim 9,
    and solar energy-responsive power control switch means having a solar energy-sensing element and a power control switch responsive to said solar energy-sensing element and in off-on power controlling relation with said motor means, for enabling said motor only during periods when solar energy exceeds a desired threshold value on said solar energy-sensing element.

12. An arrangement according to claim 1,
    said differential solar energy-sensing means comprising two sets of photocells disposed at said movable collector and facing said reflector-concentrator, the effective center zones of which sets of photocells lie substantially equidistantly on either side of the North-South effective collection center of said movable collector at the zone of said differential solar energy-sensing means.

13. An arrangement according to claim 1,
    said differential solar energy-sensing means comprising two heat sensing elements disposed on and movable in synchronism with said movable collector and facing said reflector-concentrator, the effective center zones of which two heat-sensing elements lie substantially equidistantly on either side of the North-South effective collection center of said movable collector at the zone of said differential solar-energy-sensing means.

* * * * *

UNITED STATES PATENT AND TRADEMARK OFFICE
CERTIFICATE OF CORRECTION

PATENT NO. : 4,004,574

DATED : January 25, 1977

INVENTOR(S) : Irwin R. Barr

It is certified that error appears in the above—identified patent and that said Letters Patent are hereby corrected as shown below:

Abstract, Line 6, between "reflector" and "concentrator" insert ---hyphen (-)--- , Abstract, Line 10, between "flector" and "concentrator" insert ---hyphen (-)--- , Abstract, Line 15, between "reflector" and "concentrator" insert ---hyphen (-)--- , Abstract, Line 16, between "reflector" and "concentrator" (first occurrence) insert ---hyphen (-)--- , Abstract, Line 16, after "roof/reflector" (second occurrence) insert ---hyphen (-) concentrator--- , Abstract, Line 27, between "reflector" and "concentrator" insert ---hyphen--- .

Column 4, Line 37, after "83A" insert ---comma (,)--- .
Column 9, Line 47, after "lower" insert ---the--- ,
Column 9, Line 61, change "collecter" to ---collector--- .
Column 11, Line 62, change "variable" to ---movable--- .
Column 12, Line 24, change dependency of Claim from "8" to ---7--- ,
Column 12, Line 34, change "solor" to ---solar--- .

Signed and Sealed this nineteenth Day of July 1977

[SEAL]

Attest:

RUTH C. MASON
Attesting Officer

C. MARSHALL DANN
Commissioner of Patents and Trademarks